US012792189B2

(12) United States Patent
Kimball et al.

(10) Patent No.: US 12,792,189 B2
(45) Date of Patent: Nov. 10, 2026

(54) SIMULTANEOUS INDUCTIVE- AND CAPACITIVE-BASED PROXIMITY, TOUCH, AND FORCE SENSING

(71) Applicant: Cirrus Logic International Semiconductor Ltd., Edinburgh (GB)

(72) Inventors: Eric A. Kimball, Austin, TX (US); Cory J. Peterson, Austin, TX (US); Anand Ilango, Austin, TX (US); Edmund M. Schneider, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 0 days.

(21) Appl. No.: 18/903,392

(22) Filed: Oct. 1, 2024

(65) Prior Publication Data

US 2025/0231649 A1 Jul. 17, 2025

Related U.S. Application Data

(60) Provisional application No. 63/620,937, filed on Jan. 15, 2024.

(51) Int. Cl.
*G06F 3/044* (2006.01)

(52) U.S. Cl.
CPC .. *G06F 3/0446* (2019.05); *G06F 2203/04105* (2013.01); *G06F 2203/04106* (2013.01); *G06F 2203/04107* (2013.01)

(58) Field of Classification Search
CPC ......... G06F 3/0446; G06F 2203/04105; G06F 2203/04106; G06F 2203/04107
See application file for complete search history.

(56) References Cited

U.S. PATENT DOCUMENTS

| | | | | |
|---|---|---|---|---|
| 7,772,839 | B2 | 8/2010 | Watson et al. | |
| 10,527,457 | B2 | 1/2020 | Bruwer | |
| 10,761,649 | B2 * | 9/2020 | Chan | G06F 3/0412 |
| 10,921,159 | B1 * | 2/2021 | Das | G01D 5/2026 |
| 11,262,874 | B2 * | 3/2022 | Lee | G01L 1/144 |
| 11,392,236 | B2 | 7/2022 | Jung | |
| 11,989,362 | B1 * | 5/2024 | Glad | H01F 17/04 |
| 2012/0092270 | A1 * | 4/2012 | Lyon | H03K 17/9622 345/173 |
| 2013/0234734 | A1 * | 9/2013 | Iida | G01L 1/146 324/661 |

(Continued)

FOREIGN PATENT DOCUMENTS

DE 102020125376 A1 3/2022

OTHER PUBLICATIONS

International Search Report and Written Opinion of the International Searching Authority, International Application No. PCT/US2024/051987, mailed Jan. 22, 2025.

*Primary Examiner* — Amy Onyekaba
(74) *Attorney, Agent, or Firm* — Jackson Walker L.L.P.

(57) ABSTRACT

A system may include a sensor and a measurement circuit communicatively coupled to the sensor and configured to measure phase information associated with the sensor, based on the phase information, determine a change in capacitance and a change in inductance associated with the sensor, and detect physical interaction by a user with a mechanical member associated with the sensor based on the change in capacitance and the change in inductance.

56 Claims, 7 Drawing Sheets

(56) References Cited

U.S. PATENT DOCUMENTS

2014/0267951 A1* 9/2014 Lee .......................... G06F 3/046
29/829
2016/0378221 A1* 12/2016 Solven .................... G06F 3/044
345/174
2017/0269754 A1* 9/2017 Liu ........................ G06F 3/0444
2017/0300166 A1* 10/2017 Rosenberg ............ G06F 3/0443
2018/0019210 A1* 1/2018 Kao ...................... H10W 42/00
2018/0166507 A1* 6/2018 Hwang ............... G06F 3/04166
2019/0094968 A1* 3/2019 Wen .................... G06F 3/04166
2019/0114011 A1* 4/2019 Kim ...................... G06F 3/0412
2019/0191599 A1* 6/2019 Kato .................... H05K 9/0081
2019/0227669 A1* 7/2019 Maharyta .............. G06F 3/0448
2019/0265832 A1* 8/2019 Chan ..................... G06F 3/0412
2020/0064160 A1 2/2020 Maru
2020/0278753 A1* 9/2020 Marijanovic ........ G01D 5/2026
2020/0382113 A1* 12/2020 Beardsworth .......... H03K 17/14
2021/0019009 A1* 1/2021 Jung ....................... G06F 3/044
2021/0019014 A1* 1/2021 Lee ....................... G06F 3/0418
2021/0034186 A1* 2/2021 Ryu ...................... G06F 3/0446
2021/0149538 A1* 5/2021 Lapointe ................ H03K 17/97
2021/0157424 A1* 5/2021 Lee ......................... G06F 3/044
2021/0231509 A1* 7/2021 Hong .................... G06F 3/0414
2021/0278920 A1* 9/2021 Tang ..................... G06F 3/0412
2021/0382596 A1* 12/2021 Lee ..................... G06F 3/04166
2022/0011868 A1* 1/2022 Junus ...................... G06F 3/045
2022/0011899 A1* 1/2022 Kim ...................... G06F 3/0418
2022/0050555 A1* 2/2022 Maruyama ............ G06F 3/0446
2022/0075500 A1* 3/2022 Chang ................... G06F 1/1671
2022/0121340 A1* 4/2022 Oh ...................... G06F 3/04144
2022/0129114 A1* 4/2022 Yamagishi ............ G06F 3/0416
2022/0137750 A1* 5/2022 Kim ...................... G06F 3/0445
345/173
2022/0252428 A1* 8/2022 Lapointe .............. G01D 18/008
2022/0255353 A1* 8/2022 Kim ...................... G06F 3/0446
2022/0342540 A1* 10/2022 Maruyama ............ G06F 3/0412
2022/0407515 A1 12/2022 Bruwer et al.
2024/0402854 A1* 12/2024 Glad ..................... G06F 3/0446
2024/0419277 A1* 12/2024 Glad ................... H01F 27/2885

* cited by examiner

SIMULTANEOUS INDUCTIVE- AND CAPACITIVE-BASED PROXIMITY, TOUCH, AND FORCE SENSING

RELATED APPLICATION

The present disclosure claims priority to U.S. Provisional Patent Application Ser. No. 63/620,937, filed Jan. 15, 2024, which is incorporated by reference herein in its entirety.

FIELD OF DISCLOSURE

The present disclosure relates in general to electronic devices with user interfaces (e.g., mobile devices, game controllers, instrument panels for vehicles, machinery, and/or appliances, etc.), and more particularly, to resonant phase sensing of resistive-inductive-capacitive sensors for use in a system for mechanical button replacement in a mobile device and/or other suitable applications.

BACKGROUND

Many traditional mobile devices (e.g., mobile phones, personal digital assistants, video game controllers, etc.) include mechanical buttons to allow for interaction between a user of a mobile device and the mobile device itself. Other systems and devices (e.g., automobiles) may also include mechanical buttons allowing a user to interact. However, because such mechanical buttons are susceptible to aging, wear, and tear that may reduce the useful life of a mobile device and/or may require significant repair if malfunction occurs, mobile device manufacturers are increasingly looking to equip mobile devices with virtual buttons that act as a human-machine interface allowing for interaction between a user of a mobile device and the mobile device itself. Ideally, for best user experience, such virtual buttons should look and feel to a user as if a mechanical button were present instead of a virtual button.

Presently, linear resonant actuators (LRAs) and other vibrational actuators (e.g., rotational actuators, vibrating motors, etc.) are increasingly being used in mobile devices to generate vibrational feedback in response to user interaction with human-machine interfaces of such devices. Typically, a sensor (traditionally a force or pressure sensor) detects user interaction with the device (e.g., a finger press on a virtual button of the device) and in response thereto, the linear resonant actuator may vibrate to provide feedback to the user. For example, a linear resonant actuator may vibrate in response to user interaction with the human-machine interface to mimic to the user the feel of a mechanical button click.

However, there is a need in the industry for sensors to detect user interaction with a human-machine interface, wherein such sensors provide acceptable levels of sensor sensitivity, power consumption, and size.

SUMMARY

In accordance with the teachings of the present disclosure, the disadvantages and problems associated with sensing of human-machine interface interactions in a mobile device may be reduced or eliminated.

In accordance with embodiments of the present disclosure, a system may include a sensor and a measurement circuit communicatively coupled to the sensor and configured to measure phase information associated with the sensor, based on the phase information, determine a change in capacitance and a change in inductance associated with the sensor, and detect physical interaction by a user with a mechanical member associated with the sensor based on the change in capacitance and the change in inductance.

In accordance with these and other embodiments of the present disclosure, a method may include measuring phase information associated with a sensor, based on the phase information, determining a change in capacitance and a change in inductance associated with the sensor, and detecting physical interaction by a user with a mechanical member associated with the sensor based on the change in capacitance and the change in inductance.

In accordance with these and other embodiments of the present disclosure, an electromagnetic shield for a sensor may include shielding material configured to shield passage of electromagnetic energy and at least one void formed in the shielding material.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
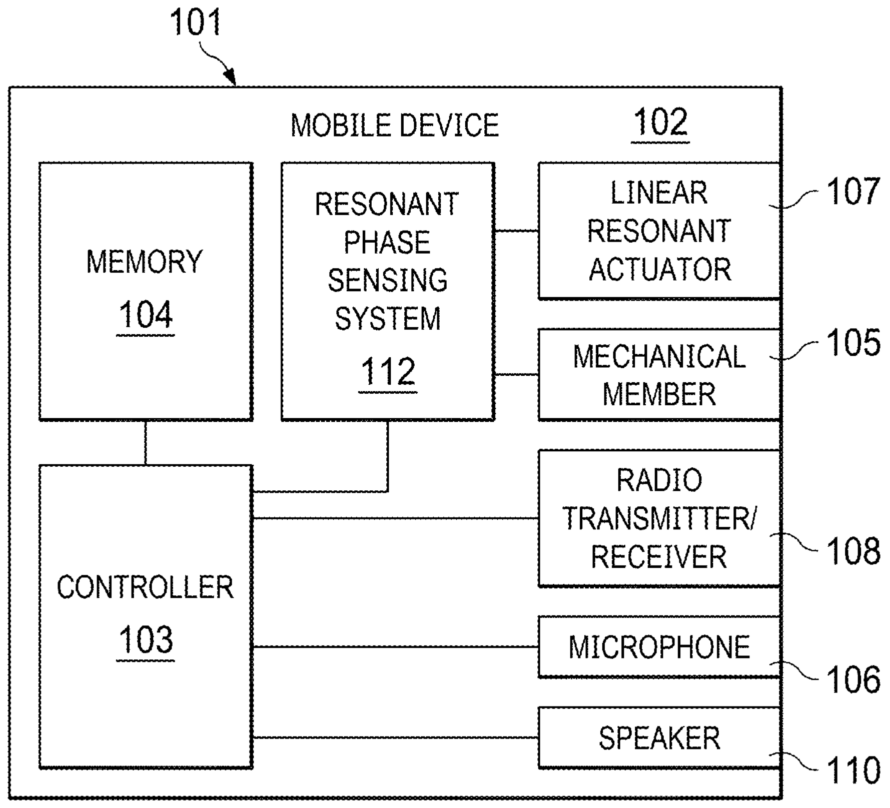
FIG. 1 illustrates a block diagram of selected components of an example mobile device, in accordance with embodiments of the present disclosure.

FIG. 1 illustrates a block diagram of selected components of an example mobile device 102, in accordance with embodiments of the present disclosure. As shown in FIG. 1, mobile device 102 may comprise an enclosure 101, a controller 103, a memory 104, a mechanical member 105, a microphone 106, a linear resonant actuator 107, a radio transmitter/receiver 108, a speaker 110, and a resonant phase sensing system 112.

Enclosure 101 may comprise any suitable housing, casing, or other enclosure for housing the various components of mobile device 102. Enclosure 101 may be constructed from plastic, metal, and/or any other suitable materials. In addition, enclosure 101 may be adapted (e.g., sized and shaped) such that mobile device 102 is readily transported on a person of a user of mobile device 102. Accordingly, mobile device 102 may include but is not limited to a smart phone, a tablet computing device, a handheld computing device, a personal digital assistant, a notebook computer, a video game controller, or any other device that may be readily transported on a person of a user of mobile device 102.

Controller 103 may be housed within enclosure 101 and may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, controller 103 may interpret and/or execute program instructions and/or process data stored in memory 104 and/or other computer-readable media accessible to controller 103.

Memory 104 may be housed within enclosure 101, may be communicatively coupled to controller 103, and may include any system, device, or apparatus configured to retain program instructions and/or data for a period of time (e.g., computer-readable media). Memory 104 may include random access memory (RAM), electrically erasable programmable read-only memory (EEPROM), a Personal Computer Memory Card International Association (PCMCIA) card, flash memory, magnetic storage, opto-magnetic storage, or any suitable selection and/or array of volatile or non-volatile memory that retains data after power to mobile device 102 is turned off.

Microphone 106 may be housed at least partially within enclosure 101, may be communicatively coupled to controller 103, and may comprise any system, device, or apparatus configured to convert sound incident at microphone 106 to an electrical signal that may be processed by controller 103, wherein such sound is converted to an electrical signal using a diaphragm or membrane having an electrical capacitance that varies based on sonic vibrations received at the diaphragm or membrane. Microphone 106 may include an electrostatic microphone, a condenser microphone, an electret microphone, a microelectromechanical systems (MEMS) microphone, or any other suitable capacitive microphone.

Radio transmitter/receiver 108 may be housed within enclosure 101, may be communicatively coupled to controller 103, and may include any system, device, or apparatus configured to, with the aid of an antenna, generate and transmit radio-frequency signals as well as receive radio-frequency signals and convert the information carried by such received signals into a form usable by controller 103. Radio transmitter/receiver 108 may be configured to transmit and/or receive various types of radio-frequency signals, including without limitation, cellular communications (e.g., 2G, 3G, 4G, LTE, etc.), short-range wireless communications (e.g., BLUETOOTH), commercial radio signals, television signals, satellite radio signals (e.g., GPS), Wireless Fidelity, etc. In some embodiments, other methods for communication (e.g., wired, optical, etc.) may be used in lieu of or in addition to radio transmitter/receiver 108.

A speaker 110 may be housed at least partially within enclosure 101 or may be external to enclosure 101, may be communicatively coupled to controller 103, and may comprise any system, device, or apparatus configured to produce sound in response to electrical audio signal input. In some embodiments, a speaker may comprise a dynamic loudspeaker, which employs a lightweight diaphragm mechanically coupled to a rigid frame via a flexible suspension that constrains a voice coil to move axially through a cylindrical magnetic gap. When an electrical signal is applied to the voice coil, a magnetic field is created by the electric current in the voice coil, making it a variable electromagnet. The voice coil and the driver's magnetic system interact, generating a mechanical force that causes the voice coil (and thus, the attached cone) to move back and forth, thereby reproducing sound under the control of the applied electrical signal coming from the amplifier.

Mechanical member 105 may be housed within or upon enclosure 101, and may include any suitable system, device, or apparatus configured such that all or a portion of mechanical member 105 displaces in position responsive to a force, a pressure, or a touch applied upon or proximately to mechanical member 105. In some embodiments, mechanical member 105 may be designed to appear as a mechanical button on the exterior of enclosure 101.

Linear resonant actuator 107 may be housed within enclosure 101, and may include any suitable system, device, or apparatus for producing an oscillating mechanical force across a single axis. For example, in some embodiments, linear resonant actuator 107 may rely on an alternating current voltage to drive a voice coil pressed against a moving mass connected to a spring. When the voice coil is driven at the resonant frequency of the spring, linear resonant actuator 107 may vibrate with a perceptible force. Thus, linear resonant actuator 107 may be useful in haptic applications within a specific frequency range. While, for the purposes of clarity and exposition, this disclosure is described in relation to the use of linear resonant actuator 107, it is understood that any other type or types of vibrational actuators (e.g., eccentric rotating mass actuators) may be used in lieu of or in addition to linear resonant actuator 107. In addition, it is also understood that actuators arranged to produce an oscillating mechanical force across multiple axes may be used in lieu of or in addition to linear resonant actuator 107. As described elsewhere in this disclosure, a linear resonant actuator 107, based on a signal received from resonant phase sensing system 112, may render haptic feedback to a user of mobile device 102 for at least one of mechanical button replacement and capacitive sensor feedback.

Together, mechanical member 105 and linear resonant actuator 107 may form a human-interface device, such as a virtual button, which, to a user of mobile device 102, has a look and feel of a mechanical button of mobile device 102.

Resonant phase sensing system 112 may be housed within enclosure 101, may be communicatively coupled to mechanical member 105 and linear resonant actuator 107, and may include any system, device, or apparatus configured to detect a physical interaction with (e.g., proximity to, touch to, and/or displacement of) mechanical member 105 indicative of a physical interaction (e.g., by a user of mobile device 102) with the human-machine interface of mobile device 102 (e.g., a force applied by a human finger to a virtual button of mobile device 102). As described in greater detail below, resonant phase sensing system 112 may detect physical interaction with mechanical member 105 by performing resonant phase sensing of a resistive-inductive-capacitive sensor for which an impedance (e.g., inductance, capacitance, and/or resistance) of the resistive-inductive-capacitive sensor changes in response to physical interaction with mechanical member 105. Thus, mechanical member 105 may comprise any suitable system, device, or apparatus which all or a portion thereof may be physically interacted with, and physical interaction may cause a change in an impedance of a resistive-inductive-capacitive sensor integral to resonant phase sense system 112. Resonant phase sensing system 112 may also generate an electronic signal for driving linear resonant actuator 107 in response to a physical interaction associated with a human-machine interface associated with mechanical member 105. Details of an example resonant phase sensing system 112 in accordance with embodiments of the present disclosure is depicted in greater detail below.

Although specific example components are depicted above in FIG. 1 as being integral to mobile device 102 (e.g., controller 103, memory 104, mechanical member 105, microphone 106, radio transmitter/receiver 108, speakers(s) 110, linear resonant actuator 107, etc.), a mobile device 102 in accordance with this disclosure may comprise one or more components not specifically enumerated above. For example, although FIG. 1 depicts certain user interface components, mobile device 102 may include one or more other user interface components in addition to those depicted in FIG. 1, including but not limited to a keypad, a touch screen, and a display, thus allowing a user to interact with and/or otherwise manipulate mobile device 102 and its associated components. In addition, although FIG. 1 depicts only a single virtual button comprising mechanical member 105 and linear resonant actuator 107 for purposes of clarity and exposition, in some embodiments a mobile device 102 may have multiple virtual buttons each comprising a respective mechanical member 105 and linear resonant actuator 107.

Although, as stated above, resonant phase sensing system 112 may detect physical interaction with mechanical member 105 by performing resonant phase sensing of a resistive-inductive-capacitive sensor for which an impedance (e.g., inductance, capacitance, and/or resistance) of the resistive-inductive-capacitive sensor changes in response to displacement of mechanical member 105, in some embodiments resonant phase sensing system 112 may detect physical interaction with (e.g., displacement of) mechanical member 105 by using resonant phase sensing to determine a change in an inductance of a resistive-inductive-capacitive sensor. In these and other embodiments, resonant phase sensing system 112 may detect interaction with (e.g., proximity to and/or touch of) mechanical member 105 by using resonant phase sensing to determine a change in a capacitance of a resistive-inductive-capacitive sensor. For example, FIGS. 2 and 3 illustrate selected components of an example simultaneous inductive and capacitive sensing application that may be implemented by resonant phase sensing system 112, in accordance with embodiments of the present disclosure.

Although FIG. 1 contemplates the use of resonant phase sensing system 112 in a mobile device 102, it is understood that the systems and methods described herein relating to resonant phase sensing of inductance and capacitance may be applied to systems, devices, and apparatuses other than mobile devices.

Figure 2:
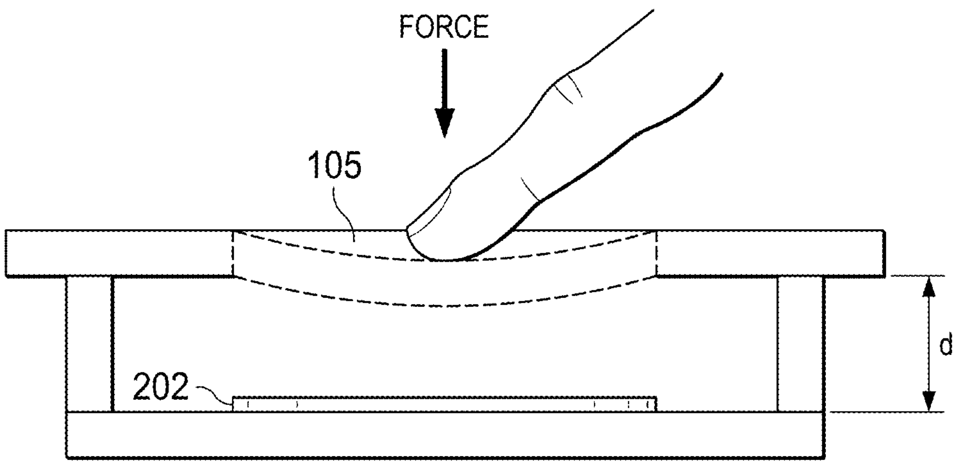
FIG. 2 illustrates a mechanical member separated by a distance from an inductive coil, in accordance with embodiments of the present disclosure.
Figure 3:
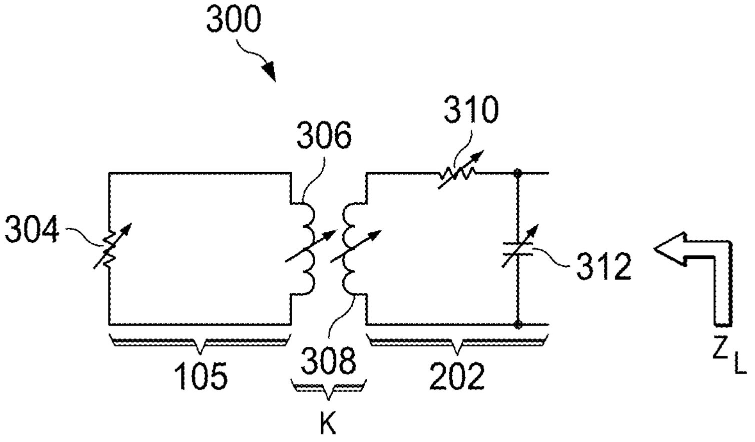
FIG. 3 illustrates selected components of an inductive sensing system that may be implemented by a resonant phase sensing system, in accordance with embodiments of the present disclosure.

FIG. 2 illustrates mechanical member 105 embodied as a metal plate separated by a distance d from an inductive coil 202, in accordance with embodiments of the present disclosure. In some embodiments, mechanical member 105 may be located at least partially on a housing of a mobile device, such as mobile device 102. FIG. 3 illustrates selected components of an inductive sensing system 300 that may be implemented by resonant phase sensing system 112, in accordance with embodiments of the present disclosure. As shown in FIG. 3, inductive sensing system 300 may include mechanical member 105, modeled as a variable electrical resistance 304 and a variable electrical inductance 306, and may include inductive coil 202 in physical proximity to mechanical member 105 such that inductive coil 202 has a mutual inductance with mechanical member 105 defined by a variable coupling coefficient k. As shown in FIG. 3, inductive coil 202 may be modeled as a variable electrical inductance 308, a variable electrical resistance 310, and a variable electrical capacitance 312.

In operation, as a current I flows through inductive coil 202, such current may induce a magnetic field which in turn may induce an eddy current inside mechanical member 105. When a force is applied to and/or removed from mechanical member 105, which alters distance d between mechanical member 105 and inductive coil 202, the coupling coefficient k, variable electrical resistance 304, and/or variable electrical inductance 306 may also change in response to the change in distance. These changes in the various electrical parameters may, in turn, modify an effective impedance ZL of inductive coil 202.

In addition to a change in inductance as a function of distance d between mechanical member 105 and inductive coil 202, a user's physical interaction with mechanical member 105, including being in proximity with (e.g., having the user's finger in proximity with) and/or touching mechanical member 105, may change variable electrical capacitance 312 associated with inductive coil 202. Thus, in accordance with the present disclosure, the same driven sensor (e.g., resistive-inductive-capacitive sensor 402 discussed below with respect to FIG. 4) may be used to sense changes in both capacitance and inductance.

Figure 4:
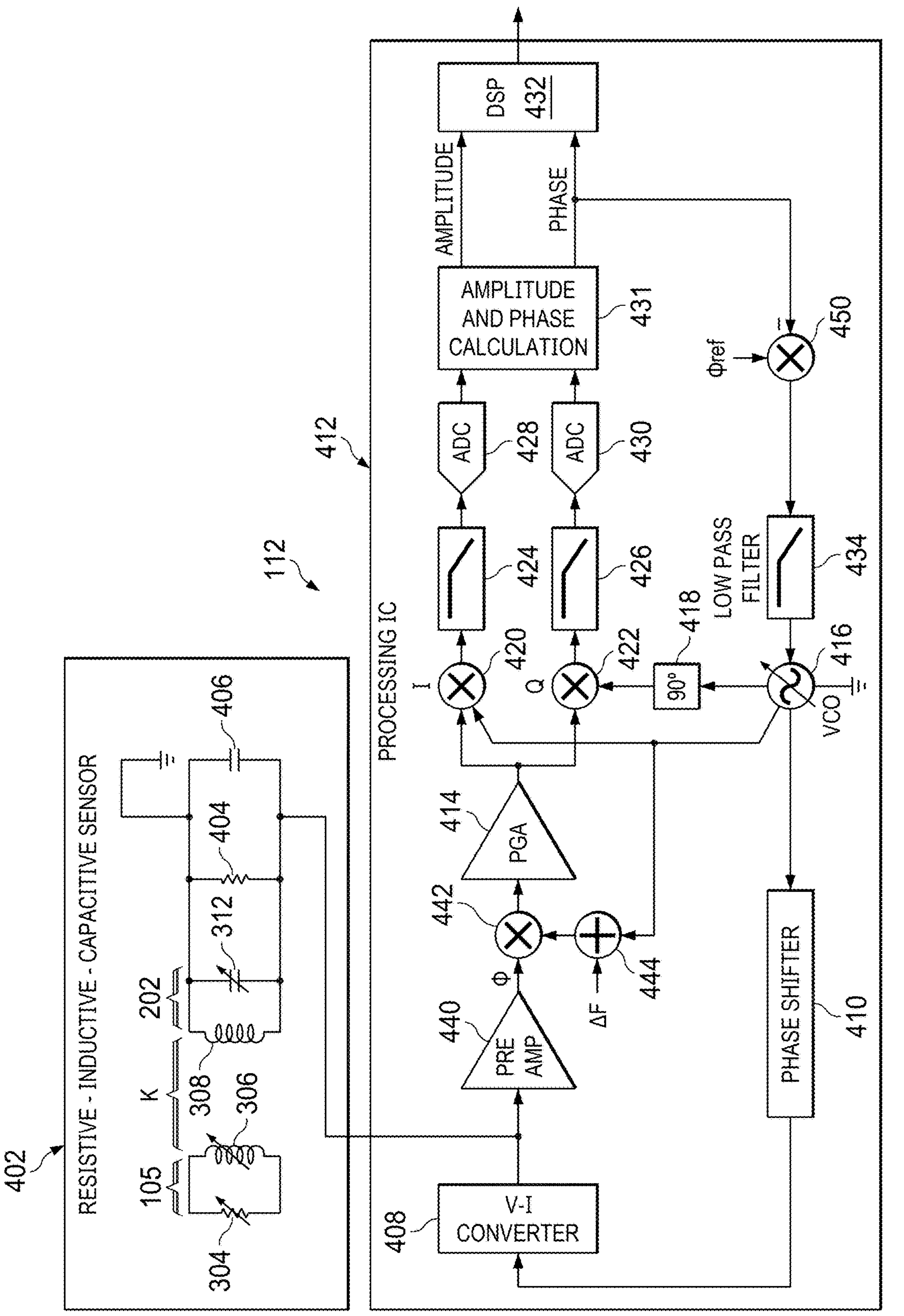
FIG. 4 illustrates a diagram of selected components of an example resonant phase sensing system, in accordance with embodiments of the present disclosure.

FIG. 4 illustrates a diagram of selected components of an example resonant phase sensing system 112, in accordance with embodiments of the present disclosure. In some embodiments, resonant phase sensing system 112 may be used to implement resonant phase sensing system 112 of FIG. 1. As shown in FIG. 4, resonant phase sensing system 112 may include a resistive-inductive-capacitive sensor 402 and a processing integrated circuit (IC) 412.

As shown in FIG. 4, resistive-inductive-capacitive sensor 402 may include mechanical member 105, inductive coil 202, a resistor 404, and capacitor 406, wherein mechanical member 105 and inductive coil 202 have a variable coupling coefficient k. Although shown in FIG. 4 to be arranged in parallel with one another, it is understood that inductive coil 202, resistor 404, and capacitor 406 may be arranged in any other suitable manner that allows resistive-inductive-capacitive sensor 402 to act as a resonant tank. For example, in some embodiments, inductive coil 202, resistor 404, and capacitor 406 may be arranged in series with one another. In some embodiments, resistor 404 may not be implemented with a stand-alone resistor, but may instead be implemented by a parasitic resistance of inductive coil 202, a parasitic resistance of capacitor 406, and/or any other suitable parasitic resistance.

Processing IC 412 may be communicatively coupled to resistive-inductive-capacitive sensor 402 and may comprise any suitable system, device, or apparatus configured to implement a measurement circuit to measure phase information associated with resistive-inductive-capacitive sensor 402 and based on the phase information, determine an interaction with mechanical member 105 (e.g., displacement of mechanical member 105 relative to resistive-inductive-capacitive sensor 402, proximity to mechanical member 105, touch of mechanical member 105). Thus, processing IC 412 may be configured to determine an occurrence of a physical interaction (e.g., press or release of a virtual button) associated with a human-machine interface associated with mechanical member 105 based on the phase information.

As shown in FIG. 4, processing IC 412 may include a phase shifter 410, a voltage-to-current converter 408, a preamplifier 440, an intermediate frequency mixer 442, a combiner 444, a programmable gain amplifier (PGA) 414, a voltage-controlled oscillator (VCO) 416, a phase shifter 418, an amplitude and phase calculation block 431, a DSP 432, a low-pass filter 434, and a combiner 450. Processing IC 412 may also include a coherent incident/quadrature detector implemented with an incident channel comprising a mixer 420, a low-pass filter 424, and an analog-to-digital converter (ADC) 428, and a quadrature channel comprising a mixer 422, a low-pass filter 426, and an ADC 430 such that processing IC 412 is configured to measure the phase information using the coherent incident/quadrature detector.

Phase shifter 410 may include any system, device, or apparatus configured to detect an oscillation signal generated by processing IC 412 (as explained in greater detail below) and phase shift such oscillation signal (e.g., by 45 degrees) such that in a normal operating frequency of resonant phase sensing system 112, an incident component of a sensor signal ϕ generated by pre-amplifier 440 is approximately equal to a quadrature component of sensor signal ϕ, so as to provide common mode noise rejection by a phase detector implemented by processing IC 412, as described in greater detail below.

Voltage-to-current converter 408 may receive the phase shifted oscillation signal from phase shifter 410, which may be a voltage signal, convert the voltage signal to a corresponding current signal, and drive the current signal on resistive-inductive-capacitive sensor 402 at a driving frequency with the phase-shifted oscillation signal in order to generate sensor signal ϕ which may be processed by processing IC 412, as described in greater detail below. In some embodiments, a driving frequency of the phase-shifted oscillation signal may be selected based on a resonant frequency of resistive-inductive-capacitive sensor 402 (e.g., may be approximately equal to the resonant frequency of resistive-inductive-capacitive sensor 402).

Preamplifier 440 may receive sensor signal ϕ and condition sensor signal ϕ for frequency mixing, with mixer 442, sensor signal ϕ to an intermediate frequency Δf combined by combiner 444 with an oscillation frequency generated by VCO 416, as described in greater detail below, wherein intermediate frequency Δf is significantly less than the oscillation frequency. In some embodiments, preamplifier 440, mixer 442, and combiner 444 may not be present, in which case PGA 414 may receive sensor signal ϕ directly from resistive-inductive-capacitive sensor 402. However, when present, preamplifier 440, mixer 442, and combiner 444 may allow for mixing sensor signal ϕ down to a lower frequency or intermediate frequency Δf which may allow for lower-bandwidth and more efficient ADCs (e.g., ADCs 428 and 430 of FIG. 4) and/or which may allow for minimization of phase and/or gain mismatches in the incident and quadrature paths of the phase detector of processing IC 412.

In operation, PGA 414 may further amplify sensor signal ϕ to condition sensor signal ϕ for processing by the coherent incident/quadrature detector. VCO 416 may generate an oscillation signal to be used as a basis for the signal driven by voltage-to-current converter 408, as well as the oscillation signals used by mixers 420 and 422 to extract incident and quadrature components of amplified sensor signal. As shown in FIG. 4, mixer 420 of the incident channel may use an unshifted version of the oscillation signal generated by VCO 416, while mixer 422 of the quadrature channel may use a 90-degree shifted version of the oscillation signal phase shifted by phase shifter 418. As mentioned above, the oscillation frequency of the oscillation signal generated by VCO 416 may be selected based on a resonant frequency of resistive-inductive-capacitive sensor 402 (e.g., may be approximately equal to the resonant frequency of resistive-inductive-capacitive sensor 402).

In the incident channel, mixer 420 may extract the incident component of amplified sensor signal ϕ, low-pass filter 424 may filter out the oscillation signal mixed with the amplified sensor signal ϕ to generate a direct current (DC) incident component, and ADC 428 may convert such DC incident component into an equivalent incident component digital signal for processing by amplitude and phase calculation block 431. Similarly, in the quadrature channel, mixer 422 may extract the quadrature component of amplified sensor signal ϕ, low-pass filter 426 may filter out the phase-shifted oscillation signal mixed with the amplified sensor signal ϕ to generate a direct current (DC) quadrature component, and ADC 430 may convert such DC quadrature component into an equivalent quadrature component digital signal for processing by amplitude and phase calculation block 431.

Amplitude and phase calculation block 431 may include any system, device, or apparatus configured to receive phase information comprising the incident component digital signal and the quadrature component digital signal and based thereon, extract amplitude and phase information.

DSP 432 may include any system, device, or apparatus configured to interpret and/or execute program instructions and/or process data. In particular, DSP 432 may receive the phase information and the amplitude information generated by amplitude and phase calculation block 431 and based thereon, determine a displacement of mechanical member 105 relative to resistive-inductive-capacitive sensor 402, which may be indicative of an occurrence of a physical interaction (e.g., press or release of a virtual button) associated with a human-machine interface associated with mechanical member 105 based on the phase information. DSP 432 may also generate an output signal indicative of the displacement. In some embodiments, such output signal may comprise a control signal for controlling mechanical vibration of linear resonant actuator 107 in response to the displacement.

The phase information generated by amplitude and phase calculation block 431 may be subtracted from a reference phase Øref by combiner 450 in order to generate an error signal that may be received by low-pass filter 434. Low-pass filter 434 may low-pass filter the error signal, and such filtered error signal may be applied to VCO 416 to modify the frequency of the oscillation signal generated by VCO 416, in order to drive sensor signal ϕ towards reference phase Øref. As a result, sensor signal ϕ may comprise a transient decaying signal in response to a "press" of a virtual button associated with resonant phase sensing system 112 as well as another transient decaying signal in response to a subsequent "release" of the virtual button. Accordingly, low-pass filter 434 in connection with VCO 416 may implement a feedback control loop that may track changes in operating parameters of resonant phase sensing system 112 by modifying the driving frequency of VCO 416.

Although a particular implementation for a processing IC is depicted in FIG. 4, it is understood that any other suitable processing IC may be used in lieu of processing IC 412, including without limitation, those processing ICs disclosed in U.S. patent application Ser. No. 16/532,850 filed Aug. 6, 2019, and incorporated by reference herein in its entirety.

Figure 5:
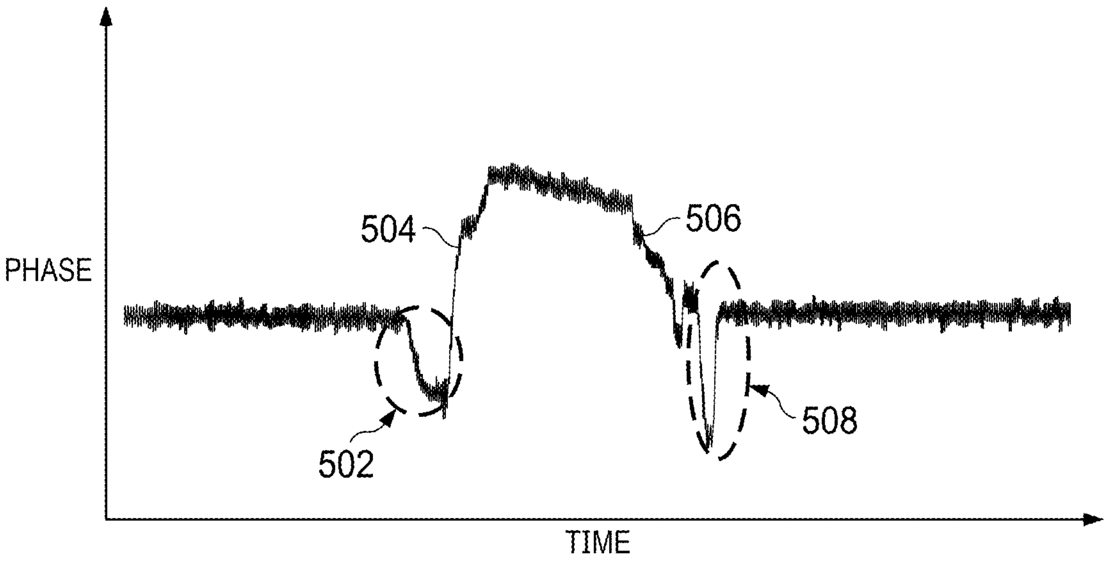
FIG. 5 illustrates a waveform of a phase signal versus time for a resistive-inductive-capacitive sensor in connection with a physical interaction with a mechanical member, in accordance with embodiments of the present disclosure.

FIG. 5 illustrates a waveform of a phase signal (e.g., signal "PHASE" output by amplitude and phase calculation block 431) versus time for resistive-inductive-capacitive sensor 402 in connection with a physical interaction with mechanical member 105, in accordance with embodiments of the present disclosure. As shown in FIG. 5, as a user moves a finger towards mechanical member 105, the proximity of the finger to mechanical member 105 may cause a change in capacitance within resistive-inductive-capacitive sensor 402 leading to a decrease in resonant phase (and also decrease in resonant frequency) below a baseline phase as indicated by decreasing portion 502 of the waveform of FIG. 5. Further, once the user has touched mechanical member 105 and applies force to mechanical member 105, a change in inductance within resistive-inductive-capacitive sensor 402 may lead to an increase in resonant phase (and also increase in resonant frequency) above the baseline phase as indicated by increasing portion 504 of the waveform of FIG. 5. In addition, as the user releases the force upon mechanical member 105, an opposite change in inductance within resistive-inductive-capacitive sensor 402 may occur, leading to a decrease in resonant phase (and also decrease in resonant frequency) below the baseline phase as indicated by decreasing portion 506 of the waveform of FIG. 5. Additionally, after the release of force and as the user moves a finger away from proximity to mechanical member 105, a change in capacitance within resistive-inductive-capacitive sensor 402 (opposite to that change that occurred as the user's finger came closer to mechanical member 105) may occur, leading to an increase in resonant phase (and also decrease in resonant frequency) to the baseline phase as indicated by decreasing portion 508 of the waveform of FIG. 5. Also, although not depicted in FIG. 5, when the user's finger is in contact with mechanical member 105, but does not apply force to mechanical member 105, resonant phase (and frequency) may remain substantially constant.

As a result, DSP 432 or another component of processing IC 412 may use these various portions of the phase response to distinguish proximity, touch, and force events in order to determine whether a valid or false press of a virtual button implemented by mechanical member 105 has occurred. For example, DSP 432 may determine if a valid press has occurred only when an inductance change has occurred in connection with a capacitance change. Likewise, DSP 432 may determine that a false press has occurred if resistive-inductive-capacitive sensor 402 experiences a capacitance change without a corresponding inductance change (proximity without force) or experiences an inductance change without a corresponding capacitance change (force without proximity).

Thus, processing IC 412 may be able to detect capacitance and inductance changes to determine whether physical interaction of a user has occurred with respect to a virtual button. However, in some traditional approaches, inductive sensing systems include a planar magnetic shield covering the inductive coil (e.g., analogous to inductive coil 202) in order to maximize sensitivity to inductance changes in resistive-inductive-capacitive sensor 402. The presence of such a shield may shield electrical fields that minimize sensitivity to capacitive changes in resistive-inductive-capacitive sensor 402. Accordingly, it may be desirable to include a shield that is more transparent to electrical fields than those used in traditional inductive-based sensors, to enable resistive-inductive-capacitive sensor 402 to sense both capacitance changes and inductance changes with suitable sensitivity.

Figure 6:
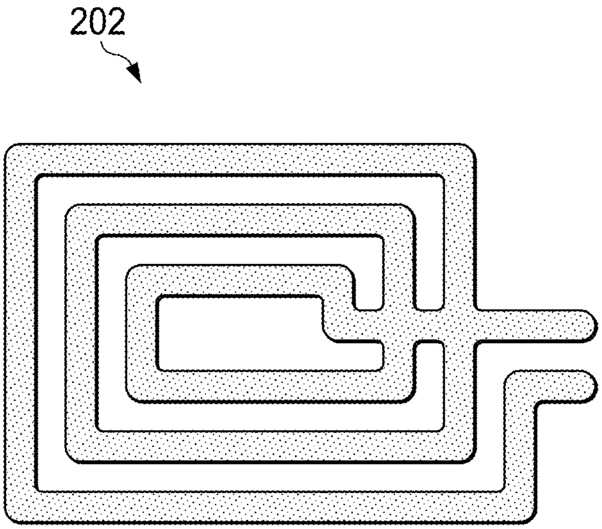
FIG. 6 illustrates an example one-layer inductive coil, which may be used to implement the inductive coil depicted in FIGS. 2-4, in accordance with embodiments of the present disclosure.

FIG. 6 illustrates an example one-layer inductive coil 202, which may be used to implement inductive coil 202 depicted in FIGS. 2-4, in accordance with embodiments of the present disclosure. The following figures and description depict example shields that may be used in connection with inductive coil 202 to provide electromagnetic shielding to enable resistive-inductive-capacitive sensor 402 to have adequate sensitivity to inductive changes while still enabling resistive-inductive-capacitive sensor 402 to have adequate sensitivity to capacitive changes. Such shields may be constructed of metal or other suitable electrically-conductive material, and may be placed in some embodiments between mechanical member 105 and inductive coil 202 and in other embodiments "behind" mechanical member 105 (e.g., on a side of mechanical member 105 opposite the side of mechanical member 105 closest to inductive coil 202). If a shield is placed behind mechanical member 105 (i.e., rather than between inductive coil 202 and mechanical member 105) such positioning may expose inductive coil 202 to the entire electrical field while also allowing a decrease in inductance as inductive coil 202 is pushed closer to the shield behind inductive coil 202. However, a tradeoff is that inductive coil 202 may be open to other sources of electromagnetic interference which may decrease sensitivity.

Figure 7:
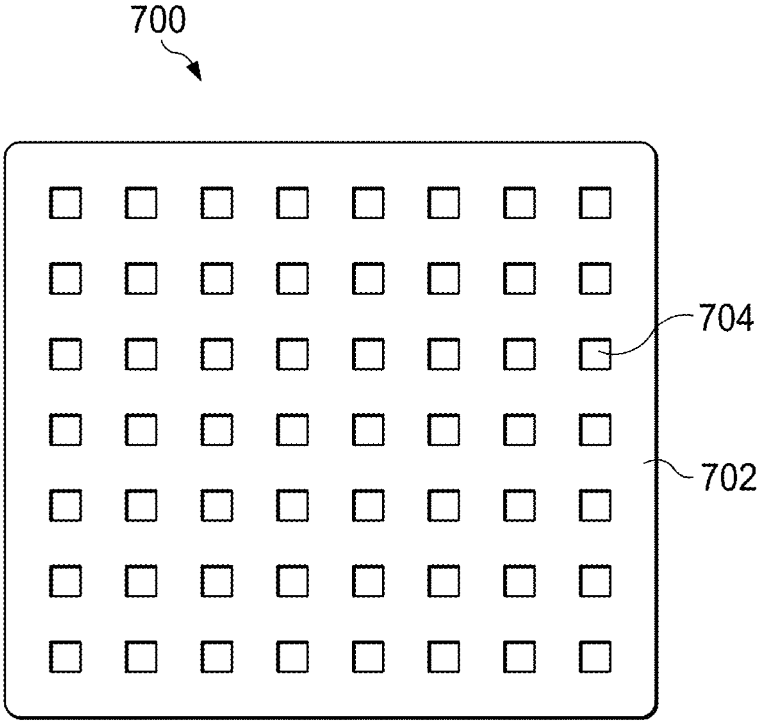
FIG. 7 illustrates an example mesh shield, in accordance with embodiments of the present disclosure.
Figure 8:
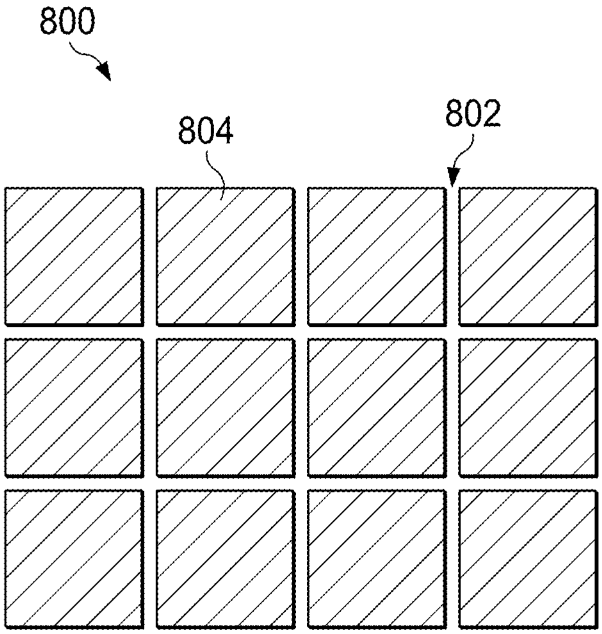
FIG. 8 illustrates an example island shield, in accordance with embodiments of the present disclosure.

FIG. 7 illustrates an example mesh shield 700, in accordance with embodiments of the present disclosure. As shown in FIG. 7, mesh shield 700 may include a sheet 702 of shielding material having a plurality of openings 704. In some embodiments, openings 704 may be similar in size and regularly spaced as shown in FIG. 7. The sizes of openings 704 may be configured (e.g., sized and shaped) such that mesh shield 700 may vary from an almost fully solid shield to a mostly open shield. Larger openings 704 may enable more electrical field to pass through mesh shield 700 to inductive coil 202, and thus sensitivity to capacitive changes may increase and sensitivity to inductive changes may decrease as openings 704 increase, and vice versa. In some embodiments, mesh shield 700 may be electrically grounded, while in other embodiments, mesh shield 700 may be electrically floating. If mesh shield 700 is grounded, then only capacitance changes that bridge across openings 704 may be sensed. If mesh shield 700 is floating, then single-ended capacitive changes to mesh shield 700 may be seen equally across inductive coil 202. FIG. 8 illustrates an example island shield 800, in accordance with embodiments of the present disclosure. Island shield 800 may be thought of as the "inverse" of mesh shield 700, and may include a plurality of islands 804 of shielding material separated by spacing 802. In some embodiments, islands 804 may be similar in size and regularly spaced as shown in FIG. 8. The sizes of islands 804 may be configured (e.g., sized and shaped) such that island shield 800 may vary from an almost fully solid shield to a mostly open shield. Smaller openings 804 may enable more electrical field to pass through island shield 800 to inductive coil 202, and thus sensitivity to capacitive changes may increase and sensitivity to inductive changes may decrease as openings 804 decrease, and vice versa.

In contrast to mesh shield 700, in island shield 800, islands 804 are electrically isolated and may be electrically coupled in a variety of ways. For example, islands 804 may be electrically grounded, creating a shield very similar to that of a grounded mesh shield 700. As another example, islands 804 may be electrically floating, such that any capacitive bridging across islands 804, due to proximity, may couple more differentially to inductive coil 202 through capacitive division and may induce a greater differential capacitance change across inductive coil 202 as compared to mesh shield 700.

Figure 9:
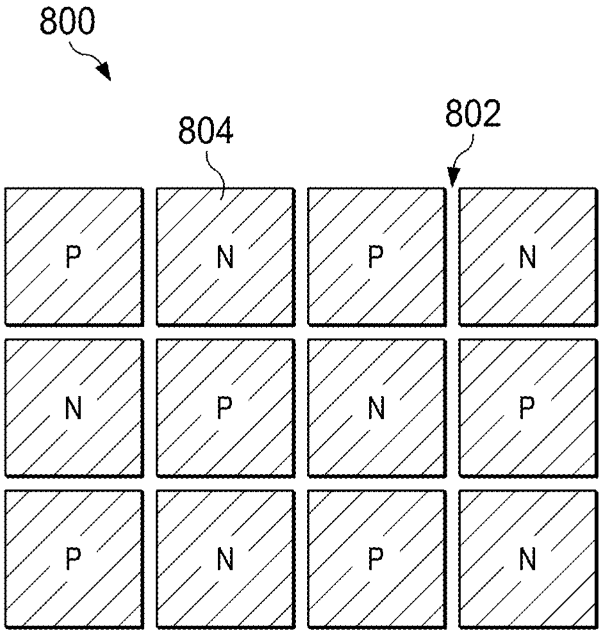
FIG. 9 illustrates an example island shield with islands of the shield coupled to different electrical potentials, in accordance with embodiments of the present disclosure.

As a further example, FIG. 9 illustrates island shield 800 with islands 804 of island shield 800 coupled to different electrical potentials, in accordance with embodiments of the present disclosure. As shown in FIG. 9, in some embodiments, islands 804 may be alternatingly coupled to positive (P) and negative (N) terminals of inductive coil 202, which may allow the same eddy currents as the grounded or floating implementations as described above, while also enabling inductive coil 202 to be more sensitive to capacitive changes as the capacitive division of the floating embodiment described above may not be present and capacitive changes may be fully differential. Although FIG. 9 depicts a particular pattern of islands 804 coupled to positive and negative terminals of inductive coil 202, it is understood that any suitable pattern may be used to tune the desired sensitivity for inductive coil 202 to inductive and capacitive changes.

Figure 10:
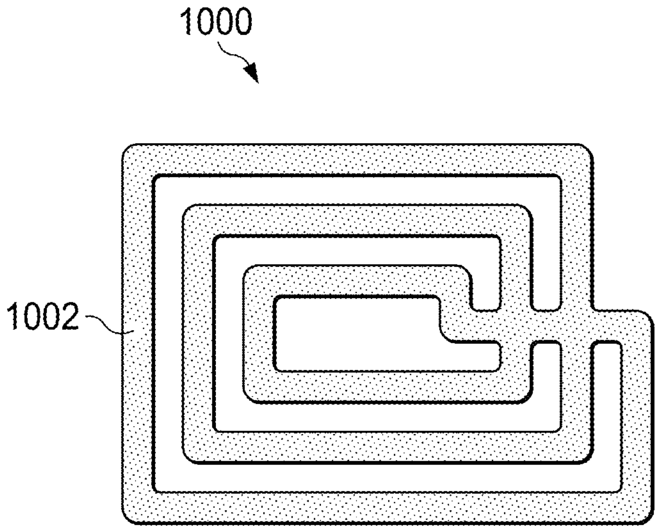
FIG. 10 illustrates an example coil shield, in accordance with embodiments of the present disclosure.

FIG. 10 illustrates an example coil shield 1000, in accordance with embodiments of the present disclosure. As shown in FIG. 10, coil shield 1000 may include a coil 1002 of shielding material. In actual use, coil shield 1000 may overlap inductive coil 202. In some embodiments, coil shield 1000 may mirror inductive coil 202 and have the same number of turns. In other embodiments, coil shield 1000 may have a different number of turns than inductive coil 202. In operation, coil shield 1000 may allow eddy currents directly above inductive coil 202, but with increased impedance as compared to a fully-filled mesh shield 700. Coil shield 1000 may allow for capacitive sensing of electrical field lines that pass through voids in coil shield 1000 and terminate at inductive coil 202. Coil shield 1000 may also allow capacitive sensing from a capacitance of a finger of a user that bridges coil shield 1000 and capacitively couples to inductive coil 202 through capacitive division. Similar to other shielding approaches described herein, coil shield 1000 may be electrically coupled in a number of ways. For example, in some embodiments, opposite terminals of coil shield 1000 may be coupled together (essentially the embodiment shown in FIG. 10) which may minimize the impedance seen by eddy currents and may allow capacitive coupling to coil shield 1000 and inductive coil 202 via capacitive division. As another example, in other embodiments, coil shield 1000 may be electrically coupled to ground, which may also minimize eddy current impedance, but may reduce capacitance on inductive coil 202 as the field lines that terminate to coil shield 1000 may terminate to ground. As a further example, both terminals of coil shield 1000 may be coupled to either of the positive terminal or negative terminals of inductive coil 202, which may provide additional sensitivity to capacitance that terminates on coil shield 1000 and on the opposite side of inductive coil 202, but may introduce some undesirable asymmetry in applications in which single-ended capacitive sensing is undesirable.

One advantage of the approach of using coil shield 1000 is that the presence of two coils (coil shield 1000 and inductive coil 202) may allow for more sophisticated functionality. For example, if inductive coil 202 resonates at a first frequency and coil shield 1000 resonates at a different second frequency, then coil shield 1000 may also be coupled to phase-sensing circuitry and proximity may be detected by changes in the phase of coil shield 1000 while the phase of inductive coil 202 remains stable while force may be detected by a phase change in both coil shield 1000 and inductive coil 202. Also, use of coil shield 1000 may fully shield inductive coil 202 and the phase of inductive coil 202 never changes, then any phase changes from coil shield 1000 may be ignored.

The coil shield approach may also be extended to include two coil shields 1000, arranged orthogonally with inductive coil 202 in three-dimensional space to enable detection from which direction a force is applied (e.g., from which direction a finger is approaching). As an example use case, a temperature control system would be able to determine, in a vehicle, whether to increase or decrease a driver temperature or a passenger temperature depending on a direction from which a press of a virtual button on a temperature button in a vehicle console came from.

Figure 11:
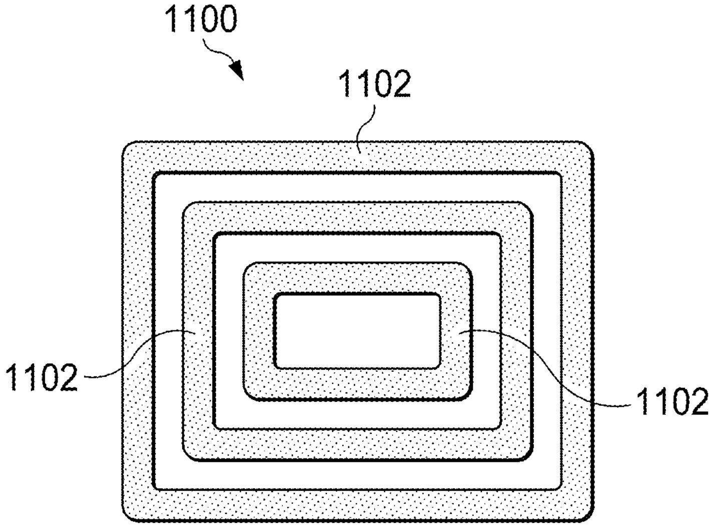
FIG. 11 illustrates an example ring shield, in accordance with embodiments of the present disclosure.

FIG. 11 illustrates an example ring shield 1100, in accordance with embodiments of the present disclosure. As shown in FIG. 11, ring shield 1100 may include a plurality of concentric rings 1102 of shielding material, each electrically isolated from one another. Functionally, ring shield 1100 may have effects similar to that of coil shield 1000. Further, in a manner similar to island shield 800, rings 1102 may be electrically coupled in a variety of ways. For example, rings 1102 may be electrically grounded, behaving similar to embodiments of island shield 800 in which islands 804 are grounded. As another example, rings 1102 may be electrically floating, capacitively dividing inductive coil 202 through capacitive division and providing sensitivity to capacitive changes that bridge from one ring 1102 to another ring 1102. As a further example, rings 1102 may be alternatively electrically coupled to the positive and negative terminals of inductive coil 202, maximizing sensitivity to changes in capacitance as such arrangement may eliminate capacitive division to inductive coil 202.

The foregoing describes a method and system of shielding a sensor that simultaneously detects both capacitance and inductance, in which the sensor is a metal inductor and the shield is a shield (or metal or of another electrically-conductive material) placed so as to modulate the inductance of the sensor as the shield moves closer to and farther from the inductor. At least one void may be formed into the metal shield so as to allow some electric field lines, and hence capacitance, to bypass the metal shield, allowing detection by the sensor. The sensor may comprise a coil of an inductor for an inductive sensing IC. The voids on the shield may form a mesh shield. The voids may be configured (e.g., sized and shapes) to enable a desired sensitivity of the sensor to capacitive changes. The mesh shield may be positioned between an applied force (i.e., by a person's finger) and the coil. The mesh shield/shielding may be positioned behind an applied force (i.e., by a person's finger) and the coil.

The voids on the shield may be formed by spaces between islands of shielding material (e.g., metal) for the metal shield. The spaces may be configured (e.g., sized and shapes) to enable a desired sensitivity of the sensor to capacitive changes. One or more of the islands may be electrically grounded. One or more of the islands may be electrically floating. The islands may be alternately electrically coupled to positive and negative terminals of the coil.

The voids on the shield may be formed by spaces in at least one coil shield that generally overlaps the coil. The terminals of at least two shield/shielding coils or islands may be shorted together to allow capacitive coupling to at least two coil shields, and then to the coil through a capacitive division. A coil shield may be grounded to reduce a capacitance on the coil as the field lines that terminate to the coil shield may terminate to ground. Both terminals of the coil shield may be electrically coupled to either a positive terminal or a negative terminal of the sensor coil. The coil may be resonated at a first frequency and the coil shield may be resonated at a different second frequency so that a force is detected by a phase change in both the coil and the first coil shield as they are pushed closer together and proximity is detected when the first coil shield phase changes while the coil frequency is stable.

Some embodiments may include a first coil shield and a second coil shield. The coil, the first coil shield, and the second coil shield may be arranged orthogonally in a three-dimensional space to detect from which direction a force is being applied.

The voids on the shield may comprise spaces between concentric shaped rings of shielding material that form a plurality of rings and the plurality of rings may generally overlap the coil.

Although the foregoing contemplates use of a coherent incident/quadrature detector as a phase detector for determining phase information associated with resistive-inductive-capacitive sensor 402, a resonant phase sensing system 112 may perform phase detection and/or otherwise determine phase information associated with resistive-inductive-capacitive sensor 402 in any suitable manner, including, without limitation, using only one of the incident path or quadrature path to determine phase information.

In some embodiments, an incident/quadrature detector as disclosed herein may include one or more frequency translation stages that translate the sensor signal into direct-current signal directly or into an intermediate frequency signal and then into a direct-current signal. Any of such frequency translation stages may be implemented either digitally after an analog-to-digital converter stage or in analog before an analog-to-digital converter stage.

Although DSP 432 may be capable of processing phase information to make a binary determination of whether physical interaction associated with a human-machine interface associated with mechanical member 105 has occurred and/or ceased to occur, in some embodiments, DSP 432 may quantify a duration of a displacement of mechanical member 105 to more than one detection threshold, for example to detect different types of physical interactions (e.g., a short press of a virtual button versus a long press of the virtual button). In these and other embodiments, DSP 432 may quantify a magnitude of the displacement to more than one detection threshold, for example to detect different types of physical interactions (e.g., a light press of a virtual button versus a quick and hard press of the virtual button).

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A system comprising:

a sensor; and a measurement circuit communicatively coupled to the sensor and configured to:

measure phase information associated with the sensor;

based on the phase information, determine a change in capacitance and a change in inductance associated with the sensor;

determine that a valid physical interaction by a user with a mechanical member associated with the sensor has occurred when the change in capacitance occurs proximate in time to the change in inductance; and determine that a false physical interaction has occurred when either the change in capacitance occurs without a corresponding change in inductance or the change in inductance occurs without a corresponding change in capacitance, wherein:

the change in capacitance indicates that a portion of the user's body is increasing or decreasing in proximity to the mechanical member; and the change in inductance indicates that a force is being applied to or released from the mechanical member.

2. The system of claim 1, wherein the mechanical member is integral to a virtual button replacing a mechanical button of a device.

3. The system of claim 1, wherein the valid physical interaction includes a portion of the user's body changing in proximity to the mechanical member, the portion of the user's body touching the mechanical member, and a force being applied to or released from the mechanical member.

4. The system of claim 1, wherein the sensor is integral to a resistive-inductive-capacitive sensor.

5. The system of claim 1, wherein the sensor comprises an inductive coil.

6. The system of claim 1, further comprising an electromagnetic shield for the sensor, wherein the sensor comprises an inductive coil, the electromagnetic shield comprising:

shielding material configured to shield passage of electromagnetic energy; and at least one void formed in the shielding material.

7. The system of claim 6, wherein the electromagnetic shield is positioned between the mechanical member and the sensor.

8. The system of claim 6, wherein the electromagnetic shield is positioned behind the mechanical member on a portion of the mechanical member opposite from another portion of the mechanical member closer in proximity to the sensor.

9. The system of claim 6, wherein the electromagnetic shield comprises a mesh of shielding material with the at least one void comprising one or more openings formed in the mesh.

10. The system of claim 9, wherein the mesh is electrically grounded.

11. The system of claim 9, wherein the mesh is electrically floating.

12. The system of claim 6, wherein the electromagnetic shield comprises a plurality of islands of shielding material with the at least one void comprising spacing between adjacent islands of the plurality of islands.

13. The system of claim 12, wherein at least one of the plurality of islands is electrically grounded.

14. The system of claim 12, wherein at least one of the plurality of islands is electrically floating.

15. The system of claim 12, wherein:

at least one first island of the plurality of islands is electrically coupled to a first terminal of the sensor; and at least one second island of the plurality of islands is electrically coupled to a second terminal of the sensor.

16. The system of claim 6, wherein the electromagnetic shield comprises a coil shield with the at least one void comprising one or more spaces formed in the coil shield.

17. The system of claim 16, wherein the coil shield substantially overlaps the inductive coil.

18. The system of claim 16, wherein the coil shield is electrically grounded.

19. The system of claim 16, wherein the coil shield is electrically floating.

20. The system of claim 16, wherein terminals of the coil shield are electrically shorted together.

21. The system of claim 20, wherein the terminals of the coil shield are electrically shorted to a terminal of the inductive coil.

22. The system of claim 16, wherein:

the inductive coil is resonated at a first frequency; and the coil shield is resonated at a second frequency;

such that the measurement circuitry detects a force applied to the mechanical member in response to changes in phase in both the inductive coil and the coil shield.

23. The system of claim 16, further comprising a second coil shield arranged such that the inductive coil is between the coil shield and the second coil shield.

24. The system of claim 23, wherein the measurement circuitry is configured to determine a direction from which a force is applied based on which of the coil shield and the second coil shield experiences a change in phase.

25. The system of claim 6, wherein the electromagnetic shield comprises a plurality of concentric rings with the at least one void comprising spaces between adjacent rings of the plurality of concentric rings.

26. The system of claim 25, wherein the plurality of concentric rings substantially overlap the inductive coil.

27. The system of claim 25, wherein at least one ring of the plurality of concentric rings is electrically grounded.

28. The system of claim 25, wherein at least one ring of the plurality of concentric rings is electrically floating.

29. The system of claim 25, wherein:

at least one first ring of the plurality of concentric rings is electrically coupled to a first terminal of the sensor; and at least one second ring of the plurality of concentric rings is electrically coupled to a second terminal of the sensor.

30. A method comprising:

measuring phase information associated with a sensor;

based on the phase information, determining a change in capacitance and a change in inductance associated with the sensor;

determining whether a valid physical interaction by a user with a mechanical member associated with the sensor has occurred or whether a false physical interaction with the mechanical member has occurred based on temporal proximity of the change in capacitance and the change in inductance, wherein the valid physical interaction occurs when the change in capacitance occurs proximate in time to the change in inductance and the false physical interaction occurs when either the change in capacitance occurs without a corresponding change in inductance or the change in inductance occurs without a corresponding change in capacitance, wherein:

the change in capacitance indicates that a portion of the user's body is increasing or decreasing in proximity to the mechanical member; and the change in inductance indicates that a force is being applied to or released from the mechanical member.

31. The method of claim 30, wherein the mechanical member is integral to a virtual button replacing a mechanical button of a device.

32. The method of claim 30, wherein the valid physical interaction includes a portion of the user's body changing in proximity to the mechanical member, the portion of the user's body touching the mechanical member, and a force being applied to or released from the mechanical member.

33. The method of claim 30, wherein the sensor is integral to a resistive-inductive-capacitive sensor.

34. The method of claim 30, wherein the sensor comprises an inductive coil.

35. An electromagnetic shield for a sensor, the electromagnetic shield comprising:

shielding material configured to shield passage of electromagnetic energy; and at least one void formed in the shielding material, wherein the electromagnetic shield is positioned behind a mechanical member associated with the sensor on a portion of the mechanical member opposite from another portion of the mechanical member closer in proximity to the sensor.

36. The electromagnetic shield of claim 35, wherein the electromagnetic shield comprises a mesh of shielding material with the at least one void comprising one or more openings formed in the mesh.

37. The electromagnetic shield of claim 36, wherein the mesh is electrically grounded.

38. The electromagnetic shield of claim 36, wherein the mesh is electrically floating.

39. The electromagnetic shield of claim 35, wherein the electromagnetic shield comprises a plurality of islands of shielding material with the at least one void comprising spacing between adjacent islands of the plurality of islands.

40. The electromagnetic shield of claim 39, wherein at least one of the plurality of islands is electrically grounded.

41. The electromagnetic shield of claim 39, wherein at least one of the plurality of islands is electrically floating.

42. The electromagnetic shield of claim 39, wherein:

at least one first island of the plurality of islands is electrically coupled to a first terminal of the sensor; and at least one second island of the plurality of islands is electrically coupled to a second terminal of the sensor.

43. The electromagnetic shield of claim 35, wherein the sensor is an inductive coil and wherein the electromagnetic shield comprises a coil shield with the at least one void comprising one or more spaces formed in the coil shield.

44. The electromagnetic shield of claim 43, wherein the sensor is an inductive coil and the coil shield substantially overlaps the inductive coil.

45. The electromagnetic shield of claim 43, wherein the coil shield is electrically grounded.

46. The electromagnetic shield of claim 43, wherein the coil shield is electrically floating.

47. The electromagnetic shield of claim 43, wherein terminals of the coil shield are electrically shorted together.

48. The electromagnetic shield of claim 47, wherein the terminals of the coil shield are electrically shorted to a terminal of the inductive coil.

49. The electromagnetic shield of claim 43, wherein:

the inductive coil is resonated at a first frequency; and the coil shield is resonated at a second frequency;

such that the measurement circuitry detects a force applied to the mechanical member in response to a change in phase in both the inductive coil and the coil shield.

50. The electromagnetic shield of claim 43, further comprising a second coil shield arranged such that the inductive coil is between the coil shield and the second coil shield.

51. The electromagnetic shield of claim 50, wherein the measurement circuitry is configured to determine a direction from which a force is applied based on which of the coil shield and the second coil shield experiences a change in phase.

52. The electromagnetic shield of claim 35, wherein the electromagnetic shield comprises a plurality of concentric rings with the at least one void comprising spaces between adjacent rings of the plurality of concentric rings.

53. The electromagnetic shield of claim 52, wherein the sensor is an inductive coil and the plurality of concentric rings substantially overlap the inductive coil.

54. The electromagnetic shield of claim 52, wherein at least one ring of the plurality of concentric rings is electrically grounded.

55. The electromagnetic shield of claim 52, wherein at least one ring of the plurality of concentric rings is electrically floating.

56. The electromagnetic shield of claim 52, wherein:

at least one first ring of the plurality of concentric rings is electrically coupled to a first terminal of the sensor; and at least one second ring of the plurality of concentric rings is electrically coupled to a second terminal of the sensor.

* * * * *